July 16, 1957   J. D. RIESER   2,799,176
ADJUSTABLE RATIO TRANSMISSION MECHANISM
Filed Aug. 3, 1953   3 Sheets-Sheet 3
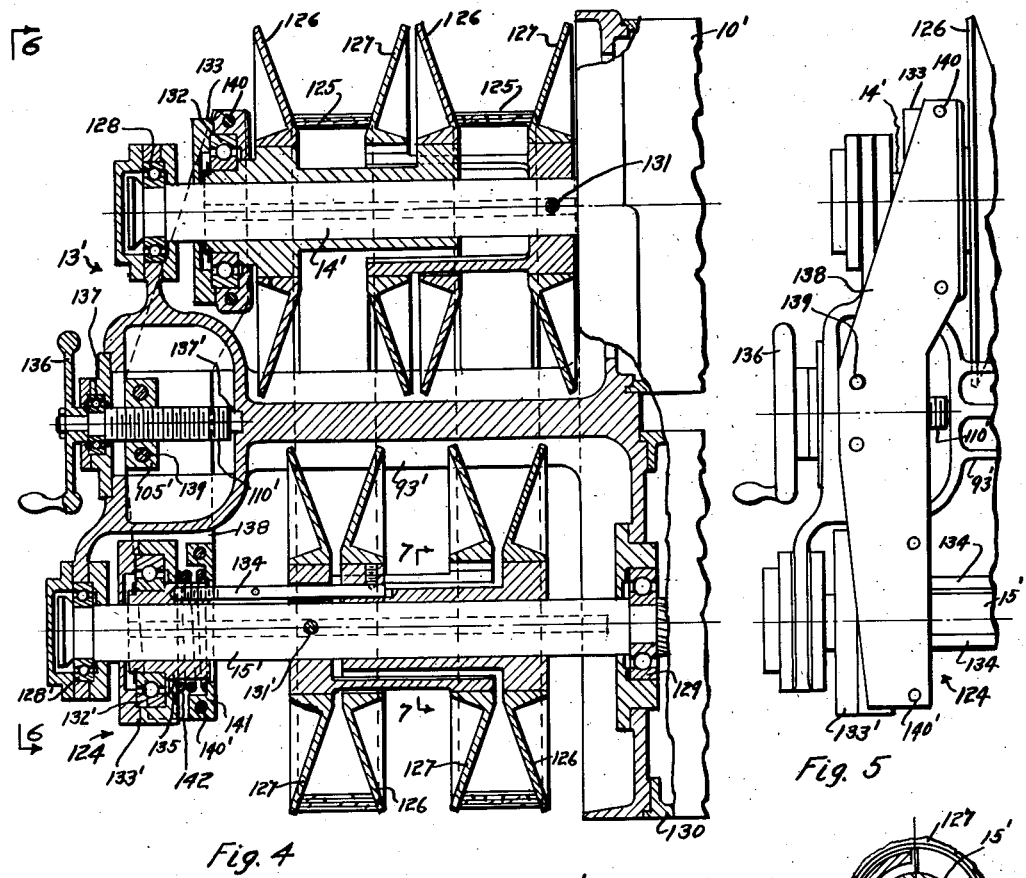
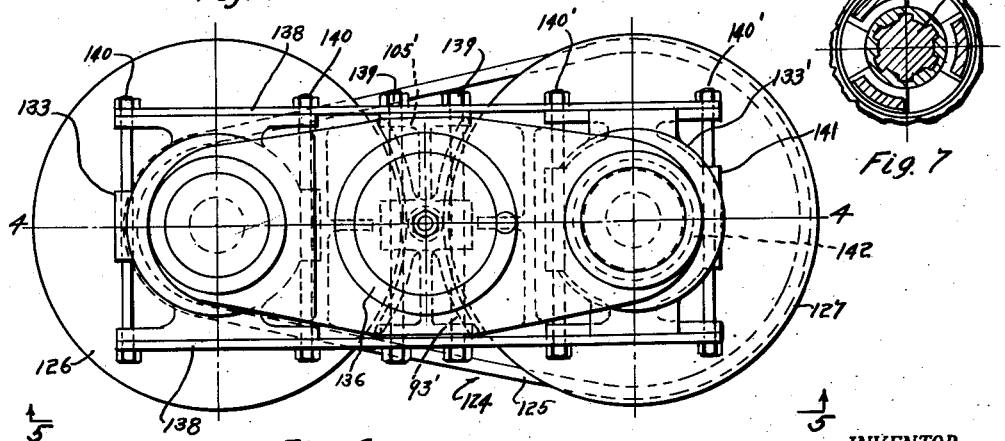
INVENTOR.
John D. Rieser
BY United States Patent Office 2,799,176
Patented July 16, 1957

2,799,176

ADJUSTABLE RATIO TRANSMISSION MECHANISM

John D. Rieser, San Francisco, Calif.

Application August 3, 1953, Serial No. 372,082

7 Claims. (Cl. 74—230.17)

This invention relates to variable ratio transmission mechanism and, more particularly to a V-belt adjustable speed transmission having a pair of adjustable effective diameter pulley structures, mounted in opposed cooperative positions in spaced parallel relationship on a pair of shafts and having an endless V-belt in active driving relation to the pulley structures to transmit power from one to the other. Each pulley having a pair of sections with opposed inclined faces for engaging opposite sides of the V-belt, and to change the drive ratio between the pair of adjustable effective diameter pulleys, an actuator operably interconnecting the transmission is provided to adjust the relative axial positions of the pulley sections. Thus with the transmission in operation, and upon moving apart of the sections the wedging engagement of the sides of the V-belt against the pulley faces causes the belt to move radially inward to a smaller effective diameter on the pulley faces. And conversely upon the pulley sections moving toward each other, the wedging engagement of the sides of the V-belt against the pulley faces causes the belt to move radially outward to a larger effective diameter. All of which is well known.

It is also well known that in variable ratio transmission mechanisms of the general character in which only one of a pair of pulleys has its effective diameter controlled directly by means of an actuator, while the other pulley of this pair is spring mounted and relies entirely upon the thrust force of the spring to press the axially movable pulley section toward the side of the V-belt, so that the spring together with the V-belt between the opposed inclined faces of the pair of sections control the effective diameter of this spring mounted pulley. Consequently in variable ratio transmission mechanisms of this type, the actuator for varying the ratio includes the spring and the V-belt. And operably in such an actuator, it is recognized that initially the spring must be flexed to provide sufficient thrust force to prevent the pulley sections being forced apart by the wedging action of the V-belt, also the deflection range of the spring after its initial flexure must be at least equal to that of the axial movement distance of the axially movable pulley section upon which the thrust force of the spring acts. All of which produces a spring having great length, which is objectionable, as inherently the length of the transmission must be made in accordance to accommodate same. Then additionally, upon the spring being flexed beyond the required initial flexing, inherently causes the spring thrust forces being greatly increased. This is undesirable, as it causes unnecessary belt wear and renders the actuation of the actuator difficult.

In my prior Patent No. 2,637,215, dated May 5, 1953, I have disclosed a construction in which the pulley sections at both the aligned shafts may be controllable and actuated by an actuator means having a lead screw with a nut threadingly connected thereto and linkage means operably connecting the pulleys and the nut. The construction shown, shows that a resilient means may be applied in manner so that its initial thrust force need not be in accordance to that of the wedging thrust force of the V belt between the faces of the relative axial movable pulley sections. And as shown one end of the resilient means abuts a mounting means that does not move axially upon actuation of the actuator, while the other end abuts a portion of the linkage means, consequently its deflection range need be in accordance to that of the axial movement distance of the pulley sections.

An object of the present invention is to provide improved and simplified variable ratio transmission mechanism of this character having an actuator means for adjusting the ratio, and having a resilient means in which its deflection range is independent of the relative axial movement range of the pulley sections.

Another object of the present invention is to provide that the resilient means together with its mounting means moves axially as a whole upon actuation of the actuator means for adjusting the ratio of a variable ratio transmission mechanism.

Another object of the present invention is to provide an improved and simplified actuator means for adjusting the ratio of a variable ratio transmission mechanism, in which upon actuation of the actuator means a resilient means is provided and adapted to move toward and away from the V-belt without causing undesirable thrust force situations.

This invention possesses other advantages and has other objects which may be made more easily apparent from consideration of the several embodiments of the invention. For this purpose there are outlined several forms. These forms will now be described in detail to illustrate the general principles of the invention, but it is to be understood that this detailed description is not to be taken in a limiting sense as the same is susceptible of modification without departing from the spirit or scope of the invention which is broadly set forth in the appended claims.

In the accompanying drawings:

Figure 4 is elevation view partly in section taken on the line 4—4 of Figure 6 and showing in section a multibelt mechanism with one of the pulley structures being interconnected to a resilient means.

Figure 5 is similar to that of the Figure 4, but showing only an exterior elevation of the actuator end portion of the mechanism, the elevation being taken on the line 5—5 of Figure 6.

Figure 6 is an end elevation similar to that of the Figure 2, but taken on the line 6—6 of Figure 4.

Figure 7 is an elevation section taken on the line 7—7 of Figure 4 to show a driving engagement means between the pulley section and the shaft which is generally typical at both shafts, this elevation section also shows the telescoping hub section of the pulley sections.

Figure 1:
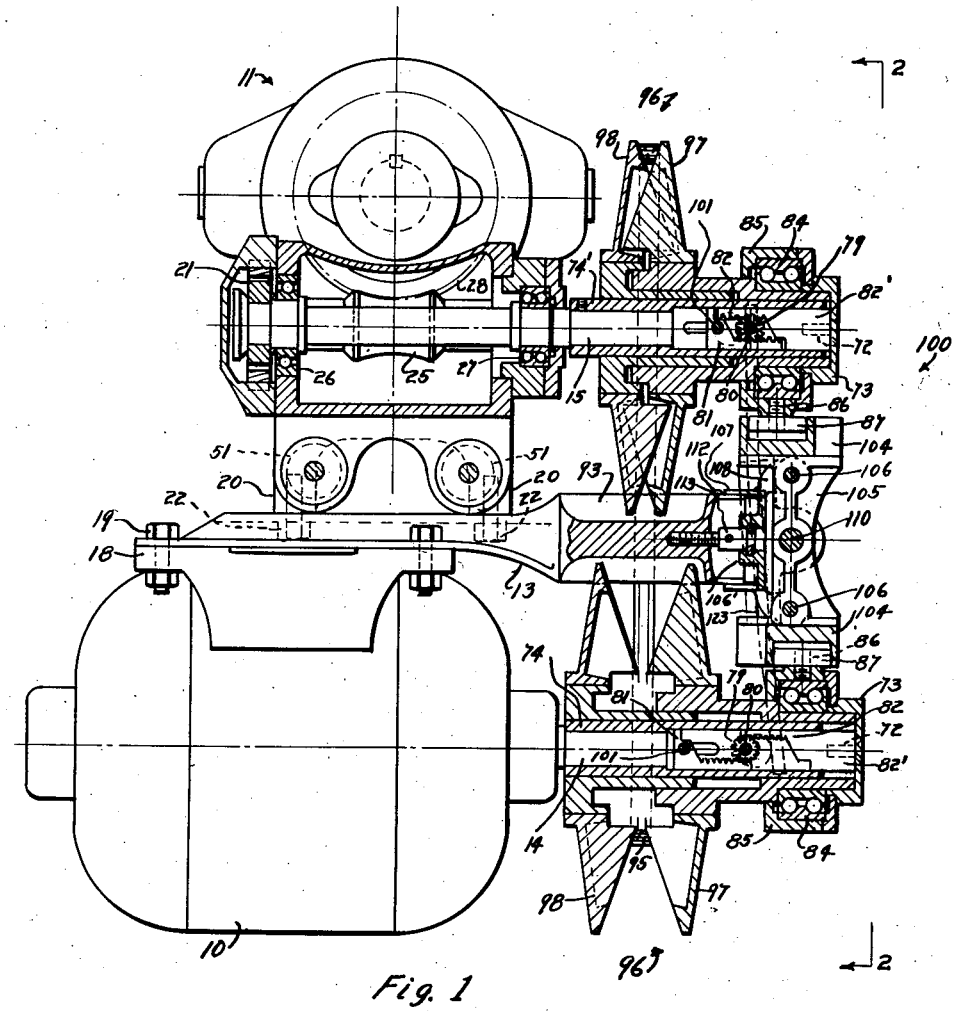
Figure 1 is an elevation view partly in section taken on the line 1—1 of Figure 2.

The general concept of my invention is to combine into the actuator for varying the ratio of a variable ratio transmission mechanism of the character described of a reactance means having a resilient means that is adapted to provide a thrust force in a desired direction. And in which upon actuation of the actuator, the resilient means together with its mounting means moves toward and away from the V-belt while substantially maintaining the magnitude of said thrust force so that the deflection range of the resilient means need not conform with that of the axial movement of the axially movable sections forming the adjustable effective diameter pulley structures.

Referring to the Figures 1 to 3, the variable ratio transmission mechanism shown therein and generally indicated by the numeral 100, hereinafter described, is generally of the same character adjustable speed transmission as that shown by my prior Patent No. 2,637,215, dated May 5, 1953. And as transmission units of this type in many cases include a driver and a geared speed change unit so as to form a complete self-contained motorized geared speed change drive, have for illustrative purposes, shown the present variable ratio transmission mechanism 100, as the drive medium between the high speed motor and the slow speed geared speed change unit. And in this example the geared speed change unit shown, has a slow speed power takeoff and a self-aligning support and reactance device which avoids entirely inducing any overhang or belt pull stresses onto the drive shaft of the driven machinery, to which the slow speed power takeoff couples rigidly and directly being of my unimount-drive shown by my Patent No. 2,603,983, dated July 22, 1952, but altered so that the slow speed power takeoff is at right angle to that of the axis of the power output shaft 14, of the motor 10.

The geared speed change unit is here described briefly in which, the self-aligning support is generally indicated by the numeral 16, of which 37 is a base for mounting the drive, and the base 37 shows a foundation for the abutment thereof of the reactance device generally indicated by the numeral 17. And the numeral 11, indicates generally a two piece gear case of which a cover portion 23, includes a spherical portion 24, shown by dotted lines therein the self-aligning support 16. And this spherical portion 24 has a hub which is bored for supporting of the bearings 30 and 31, which form support for the hollow power takeoff 29, onto which is mounted the worm gear 28, and in alignment to the worm gear 28 is journally mounted a worm 25 with its shaft, and at the Figure 2, these parts are shown by dotted lines. And in parallel alignment to the worm shaft, the gear case supportably mounts a power input shaft 15. And reduction gearing 21 being mounted onto an end of the worm shaft and the power input shaft same drivingly interconnecting these two shafts, and at the Figure 2, this reduction gearing is shown by dot and dash circles. The resilient element 51 of the reactance device 17, engages the foundation 41 and the gear case 11 and same being provided with means whereby the resilient element produces a thrust force to counteract the weight of the unit that projects beyond that of the spherical portion of the self-aligning support. The dash lines 9, Figure 2, generally indicates a drive shaft of the driven machinery onto which the slow speed power takeoff of the geared speed change unit mounts directly. The power takeoff being provided with driving means for engaging the drive shaft. In this example, see Figure 1, the gear case 11 includes the tapped lugs 20, for supportably mounting the frame 13, by means of the capscrews 22, which pass through portions of the frame and are screw threaded into said tapped lugs. The frame 13, having holes for the bolts 19 and spaced to match corresponding holes in the motor feet 18, for supportably mounting the motor 10 onto the frame in a fixed position in alignment to that of the power input shaft 15. The motor 10 is an ordinary motor, therefore detailed description is here omitted. And the power output shaft 14 of the motor being journally supported within the motor in regular manner and one of these journals being fixed to prevent endwise movement of the motor power output shaft. And one of the journals 26 and 27 journally supporting the power input shaft of the geared speed change unit, is also fixed so as to prevent of its endwise movement.

Referring to the Figure 1, the variable ratio transmission mechanism 100, includes two hollow shafts or sleeves 74 and 74', that in turn drivingly mount onto the shaft projection of the motor power output shaft 14 and the power input shaft 15 of the geared speed change unit. And in a portion of the hollow shafts 74 and 74' are supportably mounted for rotation the gears 79, the gear shaft 80 about which these gears rotate are supported by the walls of the hollow shafts. In mesh with the gears 79 within each hollow shaft, are the racks 81 and 82. Each of the racks 82 includes a shank 82' which extends through one end of the hollow shafts 74 and 74' and about the outer end of these shanks are secured by the screws 72, the thrust bearing keeper 73. The thrust bearings 84 are located in a fixed position within the bearing housing 85. To the bearing housings are secured the roller pins 86, which support the control rollers 87 (hereinafter described). The adjustable effective diameter pulley 96 at each hollow shaft are each formed of a pair of sections 97 and 98, and in this example, showing the application of narrow type V belts, they are formed to telescope into one another when adjusting from minimum effective diameter position. However, when wide section V belts are employed in this device, the inclined pulley section faces need not be of form to telescope. The hubs of the sections 98 at each of the hollow shafts are drivingly connected to an external portion of the hollow shafts so as to permit of axial movement. The hubs of each of the pulley sections 98 are joined to the racks 81 by pins 101, fitted through a portion of the hub and a portion of the rack and passing through elongated holes provided in the walls of the hollow shaft in each case. And the hubs of the pulley section 97 at each of the hollow shafts have a portion of their length in sliding contact with a portion of the hubs of the pulley section 98 and other portion of the hubs of the pulley sections 97 being drivingly connected to an external portion of the hollow shafts so as to permit of axial movement between the two. And at each shaft, externally a portion of the hubs of the pulley sections 97 being depressed so as to form, support and clamping means for the thrust bearing 84 between a shoulder and an end of a keeper 73. Thus in each case, from the control roller 87 to and including the pulley section with the rack 82 forms a unit. And as hereinabove described in each case, from the rack 81 to and including the pulley section 98 forms a unit. These two units at each hollow shaft are cooperatively joined by the gear teeth of the gear meshing with the gear teeth of the racks oppositely, and thus axial movement of one of the racks effects like axial movement of the other rack oppositely and correspondingly effects similar axial movement of the pulley sections oppositely by equal increment. As has been described, the hubs of the pulley sections 97 and 98 are sliding fit onto the hollow shafts 74 and 74', and these hollow shafts being provided with splines or keys (not shown) and the hubs being provided with keyways to provide driving connection between the adjustable effective diameter pulleys 96 and the hollow shafts 74 and 74'. It is well understood that during the axial movements of the pulley sections at a cooperating pair of adjustable effective diameter pulleys that the axial movements are not alike during the cycle of drive ratio changes, with the exception of one point only, and then for an instant do they move equally, and this is at the mid position, when the effective diameter of both pulleys are alike. And the above forms a portion of the linkage forming adjusting connection between the pulleys and the nut 105 of the actuator.

The control rollers 87, about each of the hollow shafts are in each case provided with journals (not shown) about an end of the roller pins 86. The outer diameter of the control roller 87 corresponds to and fits into the curved groove of the control member 104. These two control members 104 are supportably secured to the control nut 105, oppositely so that the centers of the curved grooves within the control members intersect at the mid position of the drive. And the control nut 105 is slidably supported about two guide pins 106, and intermediate the guide pins 106, the control nut having screw threads. The guide pins 106, being supportably secured to an adjustable support 108, which has journal supports 109 intermediate of the guide pins for the lead screw 110, and this lead screw having screw threads to provide a screw thread connection between the control nut 105 and the lead screw 110. Set collars 111 on the lead screw in adjacency to the support journals 109 on the adjustable support 108 prevent the lead screw moving in an endwise direction. And the adjustable support 108 has segments 107 of a cylinder in adjacency to the journals 109 and intermediate of the segments 107 the adjustable support 108 has a hub 106' for journally mounting and anchoring an end portion of a takeup stud 113. The segments 107 are bored to match corresponding segments 112 on an end portion of the frame 13. And in alignment with the hub 106' intermediate the segments 112, the frame 13 is screw threaded for the other end of the takeup stud 113. A capscrew 114 (see Figure 2) is threadingly connected to the segment 112 and its shank passes through a slotted hole in the segment 108, see Figure 3. The capscrew or the like serving to lock the segment 108 to the segments 112 in an adjusted position and to prevent rotation between the two. Thus it is readily seen that the frame 13 serves to support the motor 10 to the left of the variable ratio transmission mechanism while the right end portion of the frame 13 serves and furnishes anchorage and support for the adjustable support 108 which in turn is a part of the actuator means of the mechanism. The extension 93 of the frame 13 extends cantilever fashion intermediate of the adjustable effective diameter pulleys. The control nut 105 together with the two control members 104 secured thereto oppositely, form a unit, which is slidably mounted about the guide pins 106, while the lead screw 110 threaded through the nut 105 is journaled and supported by the adjustable support 108 forming an anchorage for the lead screw, which is provided with a handwheel 116 and, upon actuation of the handwheel, effects movement in a transverse direction with respect to the axis of the hollow shafts of the unit and simultaneously effects correlative axial movement of the hereinbefore described pulley section units at each of the hollow shafts, as has been described in my prior patent heretofore mentioned.

Referring to the Figure 1, the takeup stud 113, together with its interengagements described, forms a takeup means whereby the actuator means as a whole together with its adjustable support may be moved axially toward and away from the center of the V belt. For should it be desired to alter the effective diameter of the adjustable effective diameter pulleys, to effect change in the belt path length about and between the effective diameters of the adjustable pulleys to accommodate the pitch length of the belt or compensate for service wear, the capscrews 114 are loosened and the takeup stud 113 is turned in a desired direction, and due to its screw threaded connection therewith the stationary frame, moves axially as a unit the adjustable support 108 with the lead screw 110 and the guide pins 106 together with the described unit connecting the control nut 105 with the two control members 104 which in turn moves axially the control rollers 87, thrust bearings 84 and the housings 85 and the linkage means interconnecting these housings and the pulley sections, simultaneously and by equal increment. Thus it is readily seen that the takeup means provides equal change of the effective diameters of the adjustable effective diameter pulleys at both shafts, consequently the drive ratio does not change upon employment of the takeup means provided.

The wedging action of the V belt upon the inclined faces of the cooperating pulley sections, produces thrust forces in axial direction, which are transmitted onto the gear teeth of the gears 79 and the racks 81 and 82 and thence onto the control members 104, which controls positively the effective diameters of the adjustable diameter pulley structures at both shafts. And as the slope of the inclined faces of the pulley sections are substantially alike, said thrust forces may also be considered as being substantially alike at the aligned shafts.

Figures 2, 3:
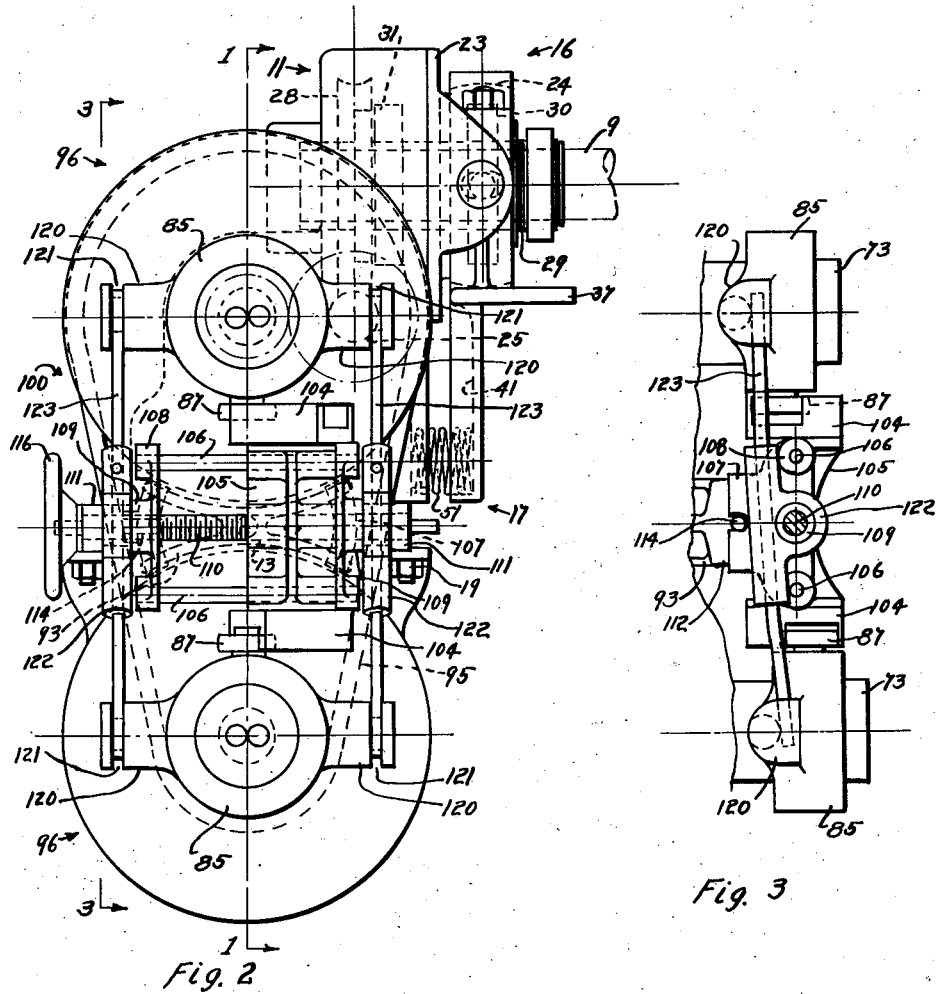
Figure 2 is an end elevation taken on the line 2—2 of Figure 1.
Figure 3 is an exterior elevation view of the actuator end portion of the mechanism shown at the Figure 1, but taken on the line 3—3 of Figure 2.

Now referring to the Figures 2 and 3, at the sides of each of the bearing housings 85, have included lugs 120, to provide surface means 121, and on the adjustable support 108, have externally depressed an end portion of the journal supports 109 to provide pivotal supports or support means for a pair of mounting means 122. A portion of the mounting means 122 being bored to match the externally depressed end portion of the journal supports 109, so as to permit of pivotal movement between the two, while being supported between a shoulder on the journal supports 109 and the set collars 111, and other portions of the supporting means 122 extending generally toward each of the shafts 74 and 74', and same having a hole therethrough for the resilient means 123. The term resilient means as here employed, pertains to a structure having rebounding properties upon being deflected, such as a spring steel metal bar or a spring. And in the present example, the resilient means 123 being formed of a section of ordinary spring steel bar, which is supportably connected therein a hole in the mounting means 122 and, extending therefrom toward and onto the surface means 121 at each shaft and engaging a portion of the lugs 120. However in assembling the resilient means onto this mechanism, same is deflected in a direction so that upon same engaging a portion of the lugs 120, produces a desired thrust force in direction generally toward the center of the V belt at each shaft. And as the pivotal support of the mounting means 122 is disposed mid distance between the shafts the magnitude of the thrust force produced by the resilient means 123 is substantially equal at each shaft. And referring to the Figures 1 and 3, it will be noted that in this example, the thrust forces produced by the wedging of the V belt hereinbefore described and the thrust forces produced by the resilient means 123 or the reactance means act in opposing directions.

Now assuming that the drive ratio of the mechanism is being varied from the position shown by the Figure 1, by actuation of the actuator means described and in so doing the bearing housing at the power input shaft 15, moves toward the right and simultaneously the bearing housing at the power output shaft 14, moves toward the left, whereupon the mounting means together with the resilient means 123 simultaneously pivots about the pivotal supports described, the engagement between the resilient means 123 and the lugs 120 at each shaft are such so as to permit of movement between the two while substantially maintaining the deflection range of the resilient means and its thrust forces. The resilient means 123 and the mounting means 122 are shown by dotted lines in the Figure 1, but the mechanism is best seen by referring to the Figures 2 and 3. Of the above, the actuator and its linkage means interconnecting to the pulley or the bearing housings, is the same as that of my patent hereinbefore mentioned. The only difference being the combining of the components of the reactance means into same.

In the adjustable ratio transmission mechanism hereinabove described, the effective diameters at each of the adjustable pulleys drivingly engaged by the V-belt are positive controlled independently of the resilient means and/or the V-belt. And in combining the reactance means therewith the actuator, provides a compact, convenient and economical method to produce thrust forces in direction opposite to the thrust forces produced by the wedging action of the V-belt as described, and cooperates in relieving the actuator compensating for these V-belt thrust forces, which avoids rendering the ratio adjustment difficult. The present invention provides that the same advantages and features may be combined into the actuator of variable ratio transmission mechanisms of the same general character, but wherein only one of the adjustable effective pulleys of a pair connects directly to a portion of the actuator means, as is hereinafter described.

However in the variable ratio transmission mechanism hereinabove described and exemplified by the Figures 1–3, the actuator which is operably mounted on the righthand end portion of the extension 93 of the frame 13, may be generally considered as being formed of the lead screw 110 together with its support journals 109, adjustable support 108 and the control nut 105. And in which the adjustable linkage means portion of said actuator consists of the control members 104 supportably mounted on the nut 105 and the control rollers 87, therein said control members, that in turn are supportably mounted on the housings 85, so that said linkage means extends between the nut 105 and the housings 85. While in this example, the support means or pivotal support consists of the depressed portion of the support journals 109, which in turn supports the mounting means 122, thus providing of the support means forming the operable engagement therewith the actuator, linkage means and the reactance means. And the combined reactance means, consists of the resilient means 123 and the numeral 121 constitutes the surface means on the housings 85. While the interconnection of the pulleys and the thrust bearings 84 within said housings 85 are the gear-shafts 80, gears 79, racks 81 and 82 and the keeper 73.

In the modified variable ratio transmission mechanism shown by the Figures 4, 5, 6 and 7 also includes combining into the actuator of a reactance means having a resilient means, but in this example, the resilient means is in the form of a common coil spring that provides a thrust force in a desired direction. And in which upon actuation of the actuator, the resilient means together with its mounting means moves toward and away from the V-belt while substantially maintaining the magnitude of said force, so that the deflection range of the resilient means need not conform with that of the axial movement distance of the axially movable sections forming the adjustable effective diameter pulley structures. The combined actuator is indicated generally by the numeral 124.

And for illustrative purposes, the mechanism shown employs two wide type V belts 125, drivingly engaging the two pairs of adjustable effective diameter pulleys, which are each formed of the pulley sections 126 and 127 in each case, see Figure 4, and when adjusting the effective diameter of the adjustable effective diameter pulleys, only one pulley section of a pair moves axially. The first group of these pulley sections being supportably and drivingly connected onto the driver shaft 14', which is supportably journaled for rotation. The journal 128 journally supports the left end of the driver shaft 14' and the other end being supported by a journal within a regular end bell of the motor 10' (not shown). The second group of pulley sections 126 and 127 being supportably and drivingly connected onto the driven shaft 15', which is supportably journaled for rotation by the journals 128' and 129. The driver shaft 14' being the motor power output shaft, while the driven shaft 15' is the power input shaft of the geared speed change unit 130. And of the first group of pulley sections on the driver shaft 14', the pulley sections 126 having like inclined faces are connected onto their hub, which is drivingly connected to the driver shaft by splines or keys (best seen at the Figure 7) while permitting of axial movement. And of the other pulley sections 127 on this same shaft, the pulley sections 127 having like inclined faces, but inclined opposite to those of the above mentioned pulley sections, are connected onto their hub, which is drivingly connected to the driver shaft by the same spline means and they are anchored onto the driver shaft by means of the pin 131 or the like. And on the driven shaft 15' the pulley sections having like inclined faces, but inclined oppositely to the pulley sections 126 on the driver shaft 14', are in a like manner connected onto their hub, which is drivingly connected to driven shaft by splines or keys, while permitting of axial movement. And the other pulley sections 127 on this same shaft, having like inclined faces, but inclined opposite to those heretofore mentioned on this shaft, are connected onto their hub, which is drivingly connected to the driven shaft by the same spline means and are anchored to the driven shaft by means of the pin 131' or the like.

The journals 128, 128' and 129 are supportably mounted by the frame generally indicated by the numeral 13'. The right end of the frame 13' being supportably mounted onto an end portion of the geared speed change unit 130 or the like (the fastenings are not shown), and in adjacency to the geared speed change unit, the frame 13' includes a support surface for an end of a regular round frame motor unit. And intermediate the pairs of adjustable effective diameter pulleys, the frame 13' has an extension 93' which extends cantilever fashion from the right end toward the left then branches outwardly and forms mounting supports for the journals 128 and 128' and their housings. And in this example, the extension 93' provides a fixed journal support for the lead screw 110' to the left of the adjustable effective diameter pulleys. It being understood that the journalling support and the hereinafter described actuator and resilient means may be disposed at other positions on the variable ratio transmission mechanism.

On the driver shaft 14' the hub of the pulley sections 126 supportably mounts and positions a thrust bearing 132 with the bearing housing 133. And on the driven shaft 15' the hub of the pulley sections 126 interconnects and through a series of pins 134 (of which only one is shown as the Figure 4) to a hub 135, which supportably mounts and anchors a thrust bearing 132' with its bearing housing 133' onto a hub 135. The hub 135 being bored and keyseated to match the driven shaft so that it rotates with this shaft while permitting of its moving in an axial direction. To the lead screw 110' is coupled the handwheel 136, so that upon actuation of the handwheel it rotates the lead screw 110' which is journally supported by the bearing 137, which is supportably mounted and anchored by the frame 13', the other end of the lead screw, may be journally supported by the extension 93' at 137'. A portion of the lead screw having screw threads to which is threadingly connected to control nut 105', so that upon actuation of the handwheel, causes the control nut to move in an axial direction. And to portions of the control nut 105' is secured the side bars 138 by bolts 139, (best seen at the Figures 5 and 6). The side bars or transverse means 138 extending from the control nut 105' toward the driver shaft 14' and the driven shaft 15', and at the driver shaft 14' the side bars 138 are secured to portions of the housing 133 by the bolts 140, while at the driven shaft 15' the side bars 138 are secured to a hollow hub or mounting means 141 by the bolts or support means 140'. The bearing housing 133' having portions extending toward and contacting surfaces on the side bars 138 so as to permit of movement in an axial direction between the two, while preventing rotation of the bearing housing 133' upon rotation of the driven shaft 15'. And of the above it will be noted that the belts with the transverse means bolted to the housing 133 and to the mounting means 141, forms a portion of the linkage, forming connection between the pulleys and the nut 105' of the actuator, which as hereinafter described provides an actuator means adapted to providing changing the ratio of this variable ratio transmission.

Thus it is readily seen that the parts composed of the control nut 105', side bars 138, thrust bearing 132, bearing housing 133, pulley sections 126 at the driver shaft 14' and the mounting means 141 at the shaft 15' form a unit, that is movable in an axial direction toward and away from the center of the V belt or belts upon actuation of the handwheel 136 in a desired direction, due to the threading connecting between the lead screw 110' and the control nut 105'. The adjacent surfaces on the bearing housing 133' and the mounting means 141 forming surface means for a resilient means in the form of a coil resilient means 142 or the like, which in assembling of the mechanism is compressed to provide a thrust force of desired magnitude in axial directions tending to force the adjacent surfaces on the bearing housing 133' and the mounting means 141 apart, and due to the fixed interconnections between the hub and the pulley sections 126 on the driven shaft 15' forces these pulley sections toward the center of the V belt, for as herein-before described the hub of these pulley sections together with the hub 135 being mounted so as to permit of axial movement. Now assuming that the transmission is in operation and that the ratio is being changed to the opposite position to that shown by the Figure 4, by actuation of the handwheel 136, which moves the unit described as a whole toward the center of the belt with consequent change of effective diameter of the adjustable effective diameter pulleys on the driver shaft 14' from their small effective diameter to their large effective diameter and simultaneously the other effective diameter of the adjustable effective diameter pulleys on the driven shaft 15' changing from their large effective diameter to their small effective diameter position and, in so doing it is to be noted that the resilient means and the mounting means together with the linkage means moves as a whole axially toward the center of the belt and when adjusting the ratio in the opposite direction to that described, the resilient means and the mounting means together with the linkage means moves as a whole axially away from the belt.

In the modified variable ratio transmission mechanism hereinabove described and exemplified by the Figures 4–6, the actuator which is operably mounted on the lefthand end portion of the extension 93' of the frame 13', may be generally considered as being formed of the lead screw 110', support journals 137 and 137', the control nut 105' and the V belt. And in which the adjustable linkage means portion of said actuator consists of the side bars 138 supportably mounted on the nut 105', and they extend between said nut 105' and the housings 133 and 133'. While in this example, the support means consists of the bolts 140', which in turn supports the mounting means 141, thus providing of the support means forming the operable engagement therewith the actuator, linkage means and the reactance means. And the combined reactance means consists of the resilient means 142, and at the shaft 15' the surface means is formed of the inner end of the housing 133'. While the interconnection of the pulley and the thrust bearing 132' within the housing 133' at the shaft 15' consists of the pins 134 and the hub 135, while at the shaft 14', same is formed of the extended hub upon which the thrust bearing 132 is mounted within the housing 133 and the snap ring shown at the end of said thrust bearing.

In the Figures 1 and 4, the adjustable effective diameter pulley at each of the aligned shafts are shown as being alike in relative size, it is well known that this is not a necessity, however, when they are alike, the relative axial movement range of the pulley sections are alike at both aligned shafts, therefore, in such cases the axial length of the resilient means 142 compressed is the same at either extreme ratio adjustment of the mechanism. Also it is well known that in transmission mechanisms of this character, that throughout the cycle of ratio adjustments, that the axial movement distances of the pulley section of a cooperating pair of pulleys are not alike, there being a continual slight difference up to a certain position and, to compensate for same a spring or the like is employed, of which one or two coils provides ample deflection range, whereas, when a spring is being employed to compensate for the entire axial movement distance of the pulley sections, same requires a multiplicity of coils so as to provide ample deflection range that is at least equal to the distance of the axial movement range of the pulley sections, resulting in a long expensive resilient spring means that upon its being compressed beyond its initial compression requirement, inherently produces undesirable thrust forces that causes unnecessary belt wear along with other undesirable situations. While the present development which provides in practical manner that the resilient means or the resilient reactance means together with its mounting means moves axially with the movable sections without causing undesirable thrust force situations. The present development solves an additional situation, which is that the spring actuated pulley when adjusting from its minimum effective diameter position, the arrangement concerning the resilient means, provides a positive movement means of the pulley sections 126, in case of the hub of same tending to bind on the shaft, which occurs in practice in the prior arrangements, due to the lack of lubricant therebetween the axial sliding surfaces.

I claim:

1. In a variable ratio transmission mechanism, having a frame, a first shaft and a second shaft rotatively supported in spaced parallel relationship, variable effective diameter pulley structures mounted in opposed cooperative positions on said shafts and wherein the pulley on said first shaft is interconnected to a thrust bearing within a first housing while on the second shaft the pulley is interconnected to a thrust bearing within a second housing, each of said pulley structures comprising a pair of sections having opposed inclined belt engaging faces, forming by relative axial adjustment of said first housing and said second housing variable effective diameters, for an endless V-belt in active driving relation to said pulley structures, driving means interengaging said pulley structures and said shafts so that they rotate uniformly with one another, an actuator for mechanically varying said ratio, said actuator having a lead screw with a nut threadingly engaging said screw and including adjustable linkage means attached to said nut while extending between said nut and said first housing and said second housing and a reactance means combined therewith, said frame supportably mounting said actuator intermediate said first and second shafts, said reactance means having a resilient means, a mounting means, a pivotal support for said mounting means, said resilient means being operably mounted by said mounting means and being confined between said pivotal support and surface means on said first housing and said second housing in flexed position so as to provide a force urging said first and second housings toward said belt simultaneously, and said pivotal support being disposed intermediate said first and second shafts as a part of said actuator, so that upon actuation of said actuator said mounting means pivots about said pivotal support while substantially maintaining said force.

2. In a variable ratio transmission mechanism, having a frame, a pair of shafts mounted in spaced parallel relationship and each mounting an adjustable effective diameter pulley, each said pulley interconnected to a thrust bearing within a housing and being mounted in opposed cooperative positions and each including a pair of sections with opposed inclined belt engaging faces, forming by relative axial adjustment of each said housing variable effective pulley diameters, for an endless V-belt in active drive relation to said pulleys, a surface means on at least one said housing, an actuator for mechanically varying said ratio, said actuator having a reactance means combined therewith and operably mounted on an extension on said frame that extends cantilever fashion intermediate said spaced shafts so that it is operably mounted in adjacency to an end of said pulleys, a lead screw with a nut threadingly connected thereto with adjustable linkage means attached to said nut while extending between said nut and each said housing, said reactance means including resilient means, said resilient means being flexed so as to provide a thrust force, an operable mounting means for mounting said resilient means, said resilient means in flexed position extending from said mounting means toward and engaging said surface means in adjacency to at least one of said shafts with said force acting between a portion of said mounting means and said surface means, so that upon actuation of said actuator causes said axial adjustment and correlative axial movement of said mounting means together with said surface means and said resilient means toward and away from said belt, and said mounting means being operably mounted apart from said shafts and side portions of said frame and in which its axis relative to that of the shaft axis remains constant while substantially maintaining said force and the axial length of said flexed resilient means throughout the range of said actuation.

3. In a variable ratio transmission mechanism, having a frame, a first and a second shaft mounted in spaced parallel relationship and each mounting an adjustable effective diameter pulley mounted in opposed cooperative positions on said shafts and wherein the pulley on the first shaft is interconnected to a thrust bearing within a first housing while on the second shaft the pulley is interconnected to a thrust bearing within a second housing, each of said pulleys including a pair of sections with opposed inclined belt engaging faces, forming by relative axial adjustment of said first housing and said second housing variable effective diameters, for an endless V-belt in active driving relation to said pulleys, driving means interconnecting said pulleys and said shafts so that they rotate uniformly with one another, one of said sections at each shaft being secured against axial movement on its respective shaft while the opposite sections together with said first and second housings being mounted to permit said axial adjustment, said frame operably mounting said mechanism and an actuator for mechanically varying said ratio, said actuator being disposed in adjacency to an end of said pulleys and operably mounted on an end portion of said frame that extends cantilever fashion longitudinally intermediate of said shafts, said actuator having a reactance means combined therewith, a lead screw with a nut threadingly connected thereto with adjustable linkage means attached to said nut while extending between said nut and the housings, said reactance means including a resilient means, said resilient means being flexed so as to provide a thrust force, mounting means for and operably mounting said resilient means, said mounting means being disposed between an end of one of the pulleys and a corresponding end of one said housing, a surface means on at least one said housing, said resilient means operably extending between an end of said mounting means and said surface means with said force actuating between the two, and in which upon actuation of said actuator causes said axial adjustment and a correlative axial adjustment of said mounting means together with said resilient means toward and away from said belt while substantially maintaining the axial length of said resilient means and said force.

4. In a variable ratio transmission mechanism, having a frame, a driver and a driven shaft mounted in spaced parallel relationship and each mounting an adjustable effective diameter pulley, each said pulley interconnected to a thrust bearing within a housing and being mounted in opposed cooperative positions and each including a pair of sections with opposed inclined belt engaging faces, forming by relative axial adjustment of each said housing variable effective pulley diameters, for an endless V-belt in active drive relation to said pulleys, said frame operably mounting said mechanism and an actuator for mechanically varying said ratio, said actuator being disposed in adjacency to an end of said pulleys and operably mounted on an end portion of said frame that extends cantilever fashion longitudinally intermediate of said driver and driven shaft, said actuator having a lead screw with a nut threadingly engaging said screw and including adjustable linkage means attached to said nut while extending between said nut and each said housing and a reactance means combined therewith, said reactance means having a resilient means, a mounting means, a pivotal support for said mounting means, said resilient means being operably mounted by said mounting means and being confined between said pivotal support and surface means on each said housing in flexed position so as to provide a force urging each said housing toward the belt simultaneously, and said pivotal support being disposed intermediate said shafts as a part of said actuator, so that upon actuation of said actuator said mounting means pivots about said pivotal support while substantially maintaining said force.

5. In a variable ratio transmission mechanism, having a frame, a pair of shafts mounted in spaced parallel relationship and each mounting an adjustable effective diameter pulley, each said pulley interconnected to a thrust bearing within a housing and being mounted in opposed cooperative positions and each including a pair of sections with opposed inclined belt engaging faces, forming by relative axial adjustment of each said housing variable effective pulley diameters, for an endless V-belt in active drive relation to said pulleys, a surface means on at least one said housing, said frame operably mounting said mechanism and an actuator for mechanically varying said ratio, said actuator being disposed in adjacency to an end of said pulleys and operably mounted on an end portion of said frame that extends cantilever fashion longitudinally intermediate of said shafts, said actuator having a lead screw with a nut threadingly engaging said screw including adjustable linkage means attached to said nut while extending between said nut and each said housing and a reactance means combined therewith, said reactance means having a resilient means, a mounting means, a support means for said mounting means, said resilient means being operably mounted by said mounting means and being confined between said support means and said surface means in flexed positions so as to provide a thrust force urging at least one said housing in an axial direction and tending to urge at least one of the corresponding pulley sections toward the belt, and said support means being a part of the actuator and disposed to form operable engagement with said linkage means and said reactance means, so that upon actuation of said actuator causes said axial adjustment and a correlative axial adjustment of said mounting means together with said resilient means toward and away from said belt while substantially maintaining said force and the axial length of said resilient means.

6. In a variable ratio transmission mechanism, having a frame, a pair of shafts mounted in spaced parallel relationship and each mounting an adjustable effective diameter pulley, each said pulley interconnected to a thrust bearing within a housing and being mounted in opposed cooperative positions and each including a pair of sections with opposed inclined belt engaging faces, forming by relative axial adjustment of each said housing variable effective pulley diameters, for an endless V-belt in drive relation to said pulleys, a surface means on at least one said housing, said frame mounting an actuator for mechanically varying said ratio, said actuator being disposed in adjacency to an end of said pulleys and operably mounted on an end portion of said frame that extends cantilever fashion longitudinally intermediate of said shafts, said actuator having a lead screw with a nut threadingly engaging said screw including adjustable linkage means attached to said nut while extending between said nut and each said housing and a reactance means combined therewith, said reactance means having a resilient means, a mounting means, a support means for said mounting means, said resilient means being operably mounted by said mounting means and being confined between said support means and said surface means in flexed position so as to provide a thrust force urging at least one said housing in axial direction tending to urge at least one of the corresponding pulley sections toward the belt, said support means being a part of the actuator and disposed to form operable engagement with said linkage means and said reactance means, so that upon actuation of said actuator causes said axial adjustment and correlative axial movement of said mounting means together with said resilient means toward and away from said belt while substantially maintaining said force, and in which the axis of said mounting means relative to the axis of said movement remains constant throughout the range of said actuation.

7. In a variable ratio transmission mechanism, having a frame, a first and a second shaft rotatively supported in spaced parallel relationship, adjustable variable effective diameter pulley structures mounted in opposed cooperative positions on said shafts and wherein the pulley on said first shaft is interconnected to a thrust bearing within a first housing while on the second shaft the pulley is interconnected to a thrust bearing within a second housing, each of said pulleys comprising a pair of sections having opposed inclined belt engaging faces, forming by relative axial adjustment of said first and second housing variable effective diameters, for an endless V-belt in active drive relation to said pulley structures, said first and second housing being in engagement with a linkage means so as to form an adjustable unit, said unit including a surface means on at least one said housing, said frame operably mounting said mechanism and an actuator for mechanically varying said ratio, said actuator being disposed in adjacency to an end of said pulleys and operably mounted on an end portion of said frame that extends cantilever fashion longitudinally intermediate of said shafts, said actuator having a reactance means combined therewith, a lead screw with a nut threadingly connected thereto with said linkage means attached to said nut, while extending between said nut and said first and second housing, and in which said first and second housing are disposed apart from said frame, said reactance means having a resilient means, a mounting means, a support means for said mounting means, said resilient means being operably mounted by said mounting means and being confined between said support means and said surface means in flexed position so as to provide a thrust force urging at least one said housing in an axial direction tending to urge at least one of the corresponding pulley sections toward the belt, said support means being a part of the actuator and disposed to form operable engagement with said linkage means and said reactance means so that upon actuation of said actuator causes said axial adjustment and a correlative axial adjustment of said mounting means together with said resilient means toward and away from said belt while substantially maintaining the magnitude of said force.

References Cited in the file of this patent

UNITED STATES PATENTS

| | | |
|---|---|---|
| 692,120 | Conner | Jan. 28, 1902 |
| 949,265 | Cutter | Feb. 15, 1910 |
| 2,096,431 | Keller | Oct. 19, 1937 |
| 2,170,212 | Pfleger | Aug. 22, 1939 |
| 2,189,294 | Pfleger | Feb. 6, 1940 |
| 2,478,870 | Heyer | Aug. 9, 1949 |
| 2,637,215 | Rieser | May 5, 1953 |

FOREIGN PATENTS

| | | |
|---|---|---|
| 11,307 | Great Britain | of 1904 |
| 96,215 | Sweden | July 11, 1939 |